April 18, 1933.     E. J. GOHR     1,904,133
PROCESS FOR TREATING HYDROCARBONS
Filed Feb. 2, 1931
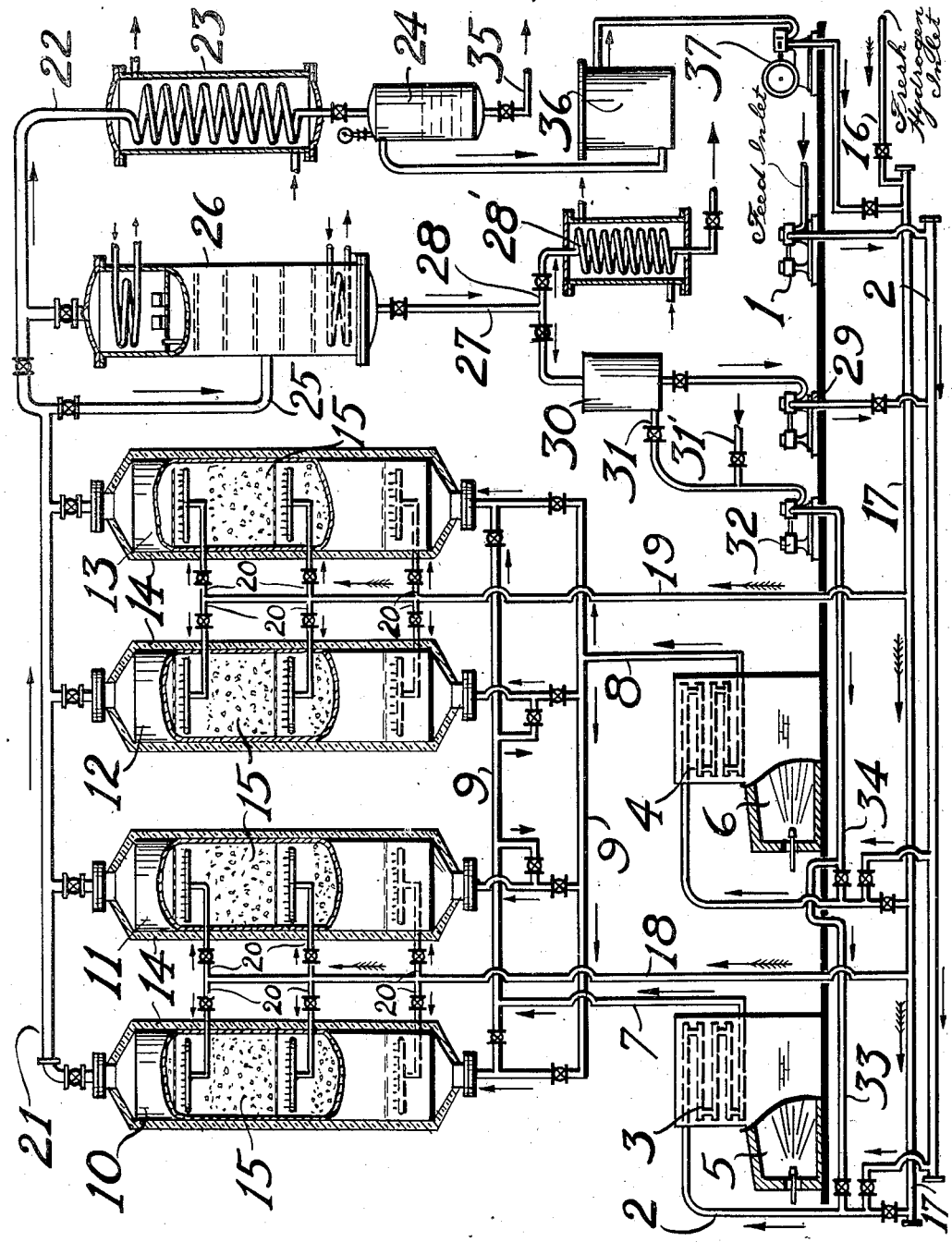
Edwin J. Gohr  Inventor
W. E. Currie  Attorney Patented Apr. 18, 1933

1,904,133

UNITED STATES PATENT OFFICE

EDWIN J. GOHR, OF ELIZABETH, NEW JERSEY, ASSIGNOR TO STANDARD-I. G. COMPANY

PROCESS FOR TREATING HYDROCARBONS

Application filed February 2, 1931. Serial No. 512,802.

The present invention relates to a process for obtaining valuable refined hydrocarbon oils of lower boiling range from crude or unrefined hydrocarbon oils of higher boiling range by reaction in the presence of hydrogen at elevated temperature and pressure. My invention will be fully understood from the following description and drawing which illustrates one form of apparatus suitable for carrying out my invention.

The drawing is a diagrammatic view in sectional elevation of an apparatus constructed to carry out my invention and indicates the flow of various materials in the process.

Referring to the drawing a hydrocarbon oil distillate is supplied from any convenient source (not shown) and is forced by pump 1 through line 2 into a plurality of heating coils of which only two are shown, namely 3 and 4, which are connected with suitable valves and piping so that the coils may be used in parallel, or the entire feed may be put through either coil. These coils are placed in suitable furnace settings 5 and 6 and discharge through pipes 7 and 8 into a manifold 9. A plurality of reaction chambers such as 10, 11, 12 and 13 are connected to this manifold in parallel with suitable valves so that any reaction chambers may be operated from either coil or may be shut off without disturbing the operation of the remaining vessels. These chambers are constructed of suitable materials to withstand the high temperatures and pressures used in this process and to resist the corrosive action of the hydrogen and other reactants. Each of the reaction chambers is covered with a layer 14 of suitable heat insulation material and each chamber may contain suitable catalysts 15 usually in lump form and supported in the reaction vessels on suitable grids (not shown). The nature of these catalysts will be described below.

Gas rich in free hydrogen which may be pure hydrogen or a mixture of hydrogen with other gases is supplied at high pressure through line 16 and manifold 17 and is mixed with the oil entering coils 3 and 4. Additional hydrogen containing gas may also be added directly to the reaction chambers at various points in the reaction chambers and is supplied by lines 18 and 19 through suitable branch connections 20.

The mixture of oil vapor and hydrogen after passing through any number of the reaction chambers may be discharged through pipe 21 and line 22 to cooler and condenser 23 and oil-gas separator 24. By an alternative method the product from the reaction chambers may be conducted by line 25 into tower 26 which may be operated at either system pressure or lower pressure, and from which lighter hydrocarbons desired as product are taken overhead with hydrogen and fixed gases to the cooler and condenser already mentioned and heavier hydrocarbons are withdrawn through line 27 and may be removed from the system through line 28 and cooler 28'. However, it is usually desirable to return these heavier fractions to the system and in this case they are collected in surge tank 30 and forced by pump 29 into feed line 2.

It is often desirable to have the recirculation pump 29 and fresh feed pump 1 connected by suitable gearing so that a constant ratio of fresh feed to recycle stock may be fed to the system. This gearing ratio should permit of wide adjustment, and in some cases, as when starting or stopping an additional unit, it may be preferable to operate the two pumps independently. It is desirable for the smooth operation of the hydrogenation units that any changes in the composition of the mixed feeds be made slowly.

In starting single hydrogenation units as part of a battery already operating it is often desirable to use a feed stock for the unit being started which contains a greater proportion of the cycle stock than the mixture supplied to the operating units. In such a case cycle stock may be withdrawn from surge tank 30 through line 31 and forced by pump 32 through lines 33 and 34 to the inlet of either of coils 3 or 4. It is understood that in starting the operation of any one of the reaction vessels one of the coils may be used solely for heating the oil to that reaction vessel, thereby permitting close control of its operation and the use of special feed stocks as described above.

In case the tower 26 is not used the total liquid product may be withdrawn from the separator by line 35 to other distillation equipment (not shown) in which the oil is separated into the lower boiling product desired and fractions of higher boiling range. The latter fractions usually boil above about 400° F. to 600° F. or higher, but the initial temperature may vary widely as it corresponds roughly to the final boiling point of the products desired. The heavier fractions may be blended with fresh hydrocarbon oils and returned to the system by pump 1, or they may be added through line 31' to line 31, and supplied to any of the units by pumps 32. In some instances the heavier fractions may contain small percentages of hydrocarbons boiling above about 800° F. and it is usually desirable to separate such hydrocarbons from the heavier fractions before returning them to the system.

The gases removed from separator 24 are usually passed through a purification system, shown diagrammatically at 36, in which hydrocarbons, sulfur compounds and other impurities are removed by suitable known methods. The purified gas consisting chiefly of free hydrogen is recompressed to the system pressure by booster compressor 37 and is supplied to the system mixed with fresh hydrogen in line 17.

The reaction which takes place in the hydrogenation of hydrocarbon oils is accompanied by substantial heat evolution especially when operating in the vapor phase at temperatures above 900° F. and is very sensitive to slight changes of temperature in this range. I have found that relatively small variations in temperature of the coil outlet may produce large and even dangerous temperature changes within the reaction vessels. This is especially so when fresh hydrocarbon oils not previously hydrogenated at high temperatures are fed to the system. I have also found that the heavier fractions of higher boiling range in the product from the high temperature hydrogenation vessels is much less reactive under the same conditions of operation and a much smaller quantity of heat is evolved when this oil is supplied to the reaction chambers.

These heavier fractions may be recycled to hydrogenation units with additional fresh oil to replace the product removed, and increased yields of lighter boiling products amounting even to a total conversion of the initial hydrocarbons may be thereby obtained. I have observed that the normal variations in the operating temperature of a hydrogenation unit cause corresponding variations in both the amount and the refractory nature of the recycle oils. These variations in turn are transmitted to the mixture of recycle and fresh oil, and temperature control in the hydrogenation zone is therefore very difficult.

In my improved process I operate several hydrogenation units simultaneously and return the recycle oil to the several units in a fixed distribution ratio. The normal operating variations in the several units thereby act in a compensatory manner, and the variations in the amount and quality of the recycle oil to each unit are greatly lessened, and the control of the individual units is greatly simplified.

Single additional units are put into operation on a mixture of fresh oil and recycle oils from units already operating without seriously affecting the operation conditions of the latter. It has been customary to start such units heretofore only on fresh feed and in this case the coil outlet and oven temperatures must be raised very slowly to prevent the excessive heat effect in the oven from causing the temperature of the ovens to get beyond control. By starting additional units on a blended stock of fresh feed and refractory recycle stocks, which approximates the mixture desired at normal operating conditions, I avoid the large heat effects described above and bring the additional unit to operating temperatures rapidly and safely.

It is desirable to provide a proportion of recycle to fresh oil during the starting period not less than that used during normal operation since control is more difficult during the starting period. The catalyst also is unseasoned and may be injured by excessive temperatures. The feed to the unit being started may consist entirely of cycle stock. After reaching the conditions of steady operation the proportion of recycle to fresh oil in the various units of the battery is gradually brought to substantially the same ratio in all units.

During the period of operation at low temperatures below about 800° F. in starting a unit, or in cooling a unit down prior to stopping its operation, highly saturated products are usually formed. It is preferable to withdraw the product of such units through condensers, coolers, and fractionating equipment which are separate from those used for products from the normally operating units of the battery. The product produced during such starting and stopping periods may be fractionated to produce valuable burning oils, saturated gasolines, and cracking stocks, or part or all of it may be recycled to the hydrogenation units.

In the preferred form of operation the oil and hydrogen or oil alone is preheated in the coil, or coils, if two or more are used, to a temperature above about 700° F. to 800° F. and usually not exceeding 860 to 950° F. The material is then discharged into the reaction chambers where contact with the catalyst accelerates the hydrogenation reaction with concurrent evolution of heat. I allow this evolved heat to bring the temperature of the oil up to temperatures usually in excess of 900° F. and in most cases between 930 and 1025° F. since the drums are well insulated. However, if the oil treated is particularly refractory and the heat effect of the hydrogenation reaction is slight it may be desirable to operate with the coil outlet at higher temperatures, even approaching the maximum temperature of the reaction chambers. I may supply additional heat to the reaction chambers by electrical heaters, or other means, but in general I prefer to operate using only the heat supplied by the coil and the exothermic heat of reaction.

The exact chamber temperature under which the process is carried out depends on the nature of the feed stock and the product desired. If an aromatic product is desired it is preferable to operate in the upper range of temperatures, on the other hand the lower range is more suitable for saturated materials. The temperature in the chambers is adjusted by admission of cold hydrogen at selected points, or by variation of the coil outlet temperature. The oil in the preheating coils may be in the liquid or vapor phase and is preferably passed through the coils with sufficient velocity to limit decomposition in the coils to the production of 3 to 15 percent of light oils boiling below 400° F., although in certain cases it may be higher.

The pressure used, as the temperature, depends somewhat on the nature of the product desired, but should ordinarily be in excess of 20 atmospheres. The quantity of hydrogen which it is necessary to circulate is generally in excess of 1000 cubic feet per barrel of oil, usually being from 2000 to 5000 cubic feet per barrel, but may be in certain cases where more saturation is desired as high as 10,000 cubic feet.

The feed stocks which are suitable for my process preferably consist of distillate oils containing no asphaltic materials such as heavy naphtha, kerosene, gas oil or unfinished gasolines. From these materials it is possible to produce valuable light oils, for example, motor fuels of excellent anti-knock characteristics. The feed rate is governed largely by the products desired and the temperature used and may vary from 0.5 to 3.0 volumes of oil per volume of reaction chamber per hour, although it may be in excess of this, particularly when higher temperatures are used and when charging low boiling point stocks.

Catalytic materials for use in the reaction drum may comprise materials such as chromium, molybdenum, or tungsten oxides, or other compounds or mixtures of these materials with each other or with other materials, for example alkaline earth compounds, rare earths, zinc oxide or alumina.

My invention is not to be limited by any theory of the mechanism of the reactions nor to any specific example which may have been given for purpose of illustration but only by the following claims in which I wish to claim all novelty inherent in the invention.

I claim:

1. An improved method for putting in operation an additional unit in an operating battery of continually recycling destructive hydrogenation units comprising passing a feed stock which consists of a mixture of high boiling fractions obtained from the product of the operating units of the battery with hydrogen under pressure in excess of 20 atmospheres through the additional unit until the temperature of operation within the destructive hydrogenation range from 700 to 925° F. is obtained therein, then gradually substituting fresh oil for a portion of the heavy fractions derived from the other operating units and bringing the ratio of fresh feed to recycled high boiling fractions to substantially the same value in all of the units of the battery.

2. An improved method according to claim 1 in which the feed stock to the additional unit comprises fresh oil and heavy fractions derived from the product of the operating units and the ratio of said fresh oil to heavy fractions is not greater than the ratio of the said fractions in the feed to the already operating units.

EDWIN J. GOHR.